United States Patent
Fukushima et al.

(10) Patent No.: US 10,816,434 B2
(45) Date of Patent: Oct. 27, 2020

(54) APPARATUS AND METHOD FOR LEAK TESTING

(71) Applicant: Fukuda Co., Ltd., Tokyo (JP)

(72) Inventors: Satsuo Fukushima, Tokyo (JP);
Yusuke Mochizuki, Tokyo (JP);
Masakazu Ito, Tokyo (JP)

(73) Assignee: FUKUDA CO., LTD., Tokyo (JP)

( * ) Notice: Subject to any disclaimer, the term of this patent is extended or adjusted under 35 U.S.C. 154(b) by 238 days.

(21) Appl. No.: 15/779,439

(22) PCT Filed: Dec. 13, 2016

(86) PCT No.: PCT/JP2016/087004
§ 371 (c)(1),
(2) Date: May 25, 2018

(87) PCT Pub. No.: WO2017/104643
PCT Pub. Date: Jun. 22, 2017

(65) Prior Publication Data
US 2018/0328812 A1 Nov. 15, 2018

(30) Foreign Application Priority Data

Dec. 14, 2015 (JP) .................. 2015-243622
Jun. 10, 2016 (JP) .................. 2016-115963

(51) Int. Cl.
*G01M 3/32* (2006.01)
(52) U.S. Cl.
CPC .......... *G01M 3/3272* (2013.01); *G01M 3/329* (2013.01)
(58) Field of Classification Search
None
See application file for complete search history.

(56) References Cited

U.S. PATENT DOCUMENTS

| 4,675,834 | A | * | 6/1987 | Furuse | G01M 3/3263 374/4 |
| 5,546,789 | A | * | 8/1996 | Balke | G01M 3/3281 73/40 |

(Continued)

FOREIGN PATENT DOCUMENTS

| DE | 102014219481 A1 * | 3/2016 | .......... G01M 3/3281 |
| JP | H04-132926 A | 5/1992 | |

(Continued)

OTHER PUBLICATIONS

Chinese Patent Office, First Office Action in corresponding CN Application No. 201680081714.7, dated Sep. 23, 2019.

(Continued)

*Primary Examiner* — Paul M. West
*Assistant Examiner* — Mark A Shabman
(74) *Attorney, Agent, or Firm* — Jodi A. Reynolds, Esq.; Harter Secrest & Emery LLP

(57) ABSTRACT

It is an object of the present invention to provide same results of leak judgments even if conditions such as temperature and pressure vary as long as sizes of sealing defects are same. A leak device 5 that generates regular leakage under regular temperature and pressure is made communicable with a test path 19 through which a test pressure is provided. A device actual measurement leak value of the leak device 5 is actually measured by a leakage measuring instrument 33. An object actual measurement leak value of a test object 9 is actually measured by the leakage measuring instrument 33. The object actual measurement leak value is converted into a regular-conditions-converted leak value based on the device actual measurement leak value and a leakage is judged based on the regular-conditions-converted leak value.

3 Claims, 5 Drawing Sheets

(56) References Cited

U.S. PATENT DOCUMENTS 5,663,487 A 9/1997 Widt
2017/0292894 A1* 10/2017 Decker ............... G01M 3/3281

FOREIGN PATENT DOCUMENTS

| JP | H09-508471 A | 8/1997 |
|----|--------------|--------|
| JP | H10-132695 A | 5/1998 |
| JP | 2002-107258 A | 4/2002 |
| JP | 2012-032351 A | 2/2012 |
| JP | 2012-112752 A | 6/2012 |
| JP | 2013-134180 A | 7/2013 |

OTHER PUBLICATIONS

International Search Report for International Patent Application PCT/JP2016/087004 dated Mar. 7, 2017.
Korean Patent Office, Office Action in corresponding KR Application No. 1020187019648, dated Aug. 5, 2019 and English translation from Google Translate.
English translation of the International Preliminary Report on Patentability and Written Opinion of the International Searching Authority for PCT/JP2016/087004 dated Jun. 19, 2018.

* cited by examiner

APPARATUS AND METHOD FOR LEAK TESTING

FIELD OF THE INVENTION

The present invention relates to an apparatus and method for leak testing, and particularly relates to an apparatus and method for leak testing using a leak device that produces a constant quantity of leakage under regular temperature and pressure conditions.

BACKGROUND OF THE INVENTION

When making a judgment on acceptance or rejection of a work (test object) using an air leak tester (leak testing apparatus), it is a general practice to adopt a "quantity of leakage" as a unit of criteria for the judgment. A decrease in pressure is measured inside the air leak tester. While an increase in pressure is measured in a negative pressure method or a chamber method, description hereinafter will be made on the premise of using a pressure method for the sake of simplicity of description. A threshold for judging acceptance or rejection used to be often defined in terms of an amount of decrease in pressure. However, an amount of decrease in pressure may vary when a volume of work varies even if the quantity of leakage is constant. To avoid this problem, it is becoming common to define the threshold in terms of the quantity of leakage.

A leak device for calibration and maintenance or the like of an air leak tester is disclosed in Patent Document 1 (Japanese Patent Application Publication No. 2012-112752). The leak device is connected to a leak detection path. The leak device includes a capillary tube. A constant quantity of leakage is generated from the capillary tube of the leak device under regular temperature and pressure conditions.

PRIOR ART DOCUMENTS

Patent Documents

Patent Document 1: Japanese Patent Application Publication No. 2012-112752

SUMMARY OF THE INVENTION

Problem to be Solved by the Invention

However, a quantity of leakage flowing in a narrow path may vary if a pressure varies between an inlet and an outlet of the passage. The quantity of leakage may also vary due to a variation in temperature. That is, when conditions (mainly pressure and temperature) of a leak testing vary, the quantity of leakage actually flowing varies. Therefore, if a threshold is determined in terms of a quantity of leakage under fixed conditions only, the testing is not regarded as being conducted using same criteria when the pressure and the temperature vary.

A majority of a range of leakage of gas tested by an air leak tester falls within an area of viscous flow. A typical calculating formula of viscous flow is Hagen-Poiseuille equation (Expression 1).

[Expression 1]

$$Q = \frac{\pi D^4}{128 \eta L} \frac{P_1 + P_2}{2} (P_1 - P_2) \qquad (1)$$

where:
Q: flow rate (Pa·M³/S)
D: inner diameter of tube (m)
L: length of pipe (m)
η: viscosity coefficient of gas (Pa·S)
$P_1$: inlet pressure (Pa)
$P_2$: outlet pressure (Pa)

As understood by Expression 1, parameters affecting the flow rate Q (quantity of leakage) are not limited to D and L indicating properties of a "hole" that is a sealing fault of a test object. Specifically, the viscosity coefficient η of the gas varies according to the temperature (temperature of the test object and ambient temperature). The inlet pressure $P_1$ (test pressure) varies depending on a performance of a regulator or the like. The outlet pressure $P_2$ (atmospheric pressure) varies depending on meteorological and geographical conditions. Moreover, the expression (1) is for a calculation of a volumetric flow rate. The gas passing through a leak passage is also affected by contraction/expansion caused by temperature changes. Therefore, when a judgment is made based on actual flow rates, inspection criteria vary as test conditions vary.

In view of the above, it is an object of the present invention to provide a method for judging leakage that provides same results even if conditions such as temperature and pressure vary as long as sizes of sealing defects are same.

Means for Solving the Problems

To solve the problems mentioned above, the inventors conceived of shifting criteria for judging leakage from "actual leakage" to "leakage under regular conditions", and furthermore to a "size of a sealing defect of a test object".

Specifically, the present invention provides a method for leak testing for testing leakage of a test object, including steps of: converting an actually measured value of leakage of the test object into a hole-size-corresponding value based on an actually measured value of leakage of a reference leak hole from which a regular leakage is generated under regular temperature and pressure, the hole-size-corresponding value corresponding to a size of a virtual defect hole (virtual sealing defect) of the test object; and judging leakage based on the hole-size-corresponding value.

The hole-size-corresponding values are same even if test conditions such as temperature and pressure and environmental conditions vary as long as sizes of sealing defects are same. Thereby, the same results of leak judgments can be obtained.

The present invention provides a leak testing apparatus for detecting leakage of a test object, including: a leak detection path including a test path to be connected to the test object, wherein a test pressure is to be provided to the test object through the test path; a leak device disposed on the leak detection path, the leak device generating a regular leakage (referred to as a "regular leak value" hereinafter) under regular temperature and pressure (referred to as "regular conditions" hereinafter); a leak measuring instrument disposed on the leak detection path; and a processor, wherein the processor performs: a device actual measurement operation, wherein the leakage measuring instrument actually measures leakage of the leak device (referred to as "device actual measurement leak value" hereinafter); an object actual measurement operation, wherein the leakage measuring instrument actually measures leakage of the test object (referred to as "object actual measurement leak value" hereinafter); and a judgment operation, the processor converting the object actual measurement leak value into a regular-conditions-converted leak value under the regular conditions based on the device actual measurement leak value and making a leak judgment based on the regular-conditions-converted leak value.

The regular-conditions-converted leak value is an example of the hole-size-corresponding value that corresponds to a size of the virtual defect hole (virtual sealing defect) of the test object. The regular-conditions-converted leak values are same even if conditions such as temperature and pressure vary as long as sizes of sealing defects are same. Thereby, the same results of the leak judgment can be obtained.

Preferably, the leak testing apparatus further includes an apparatus housing; and a test section in which the test object is to be placed, wherein the leakage measuring instrument and the processor are disposed in the apparatus housing, and a placement portion for the test object and the leak device are disposed in the test section adjacent to each other.

Thereby, respective ambient temperatures and external pressures (outlet pressures) of the test object and the leak device can be made generally the same. Furthermore, adequacy of the conversion can be enhanced.

Preferably, the leak detection path includes a reference path including a reference container and a valve arrangement by which the reference path and the test path can be made communicable with or shut off from each other, the leakage measuring instrument is a differential pressure gauge disposed between the test path and the reference path, and while the valve arrangement makes the test path open to the atmosphere after the measurement, the valve arrangement maintains the reference path, and furthermore the reference container, under the test pressure.

Thereby, effects of adiabatic compression of the reference container or the like can be eliminated. Moreover, secondary effects as follows can be expected:

(1) Foreign objects will not enter the sensor because when a strong current is generated in a pressurizing step or an exhaust step, a sensor portion is shut-off and when the sensor is in a communicable state, there is hardly any flow because a pressure on the sensor is same as a pressure on a work (test pressure);

(2) The apparatus of the present invention can solve a problem that condensed water may accumulate inside a master (reference container) when used in a humid area and that may cause a failure of a tester, because pressurization and exhaust are repeatedly performed in the master unlike a work (test object).

(3) Enhancement of durability can be expected because stress due to the pressurization and exhaust of the differential pressor sensor (leakage measuring instrument) is reduced.

Preferably, the leak testing apparatus further includes a test pressure measuring instrument for measuring the test pressure; an external pressure measuring instrument for measuring an external pressure of the leak device or the test object; and a temperature measuring instrument for measuring ambient temperature of the leak device or the test object, wherein the processor calculates a conversion factor for converting the object actual measurement leak value into the regular-conditions-converted leak value based on values measured by the test pressure measuring instrument, the external pressure measuring instrument and the temperature measuring instrument during the object actual measurement operation, a reference leak hole size factor and the regular leak value, the reference leak hole size factor determined by a size of a reference leak hole of the leak device.

Thereby, the object actual measurement leak value can be adequately converted into the regular-conditions-converted leak value according to environmental conditions such as the ambient temperature and the external pressure during the actual measurement of the test object.

The present invention provides a method for leak testing for testing leakage of a test object, including steps of: actually measuring a leak value of a leak device (device actual measurement leak value) with the leak device made communicable with a leak detection path through which a test pressure is supplied, the leak device generating a regular leakage (referred to as a "regular leak value" hereinafter) under regular temperature and pressure (referred to as "regular conditions" hereinafter) (device actual measurement step); actually measuring a leak value of the test object (object actual measurement leak value) with the test object connected to the leak detection path (object actual measurement step); and judging, wherein the object actual measurement leak value is converted into a value under the regular conditions based on the device actual measurement leak value and a leak judgment is made based on the converted value.

The regular-conditions-converted leak value is the hole-size-corresponding value, and is constant even if the conditions such as the temperature and the pressure vary as long as the sizes of the sealing defects are the same. Thereby, the same results of the leak judgment can be obtained.

Preferably, the regular leak value is 0.8 to 1.2 times a threshold for judging leakage of the test object.

Thereby, difference between the leak device and the test object in variability characteristics according to the temperature and the pressure can be minimized.

Preferably, the test object that produces a leakage close to a leakage threshold of the leak device under a regular condition is used.

Preferably, a plurality of test objects are sequentially subjected to the leak judgment, and the device actual measurement leak value is updated by performing the device actual measurement step anew when an actual measurement leak value of a posterior test object judged to be acceptable is increased or decreased by more than a predetermined percentage with respect to an actual measurement leak value of a prior test object judged to be acceptable.

Thereby, when the temperature and the pressure vary to a great extent, accuracy of the leak judgment can be secured by resetting the device actual measurement leak value.

The actual measurement leak value of the prior test object may be the actually measured value of a test object subjected to an acceptance test after obtaining the prior actual measurement leak value of the leak device.

Preferably, a conversion factor is calculated based on the regular leak value and the device actual measurement leak value, and the object actual measurement leak value is converted into the regular-conditions-converted leak value based on the conversion factor. The conversion factor is a factor for converting the actually measured value to the regular-conditions-converted leak value.

Preferably, a conversion factor is calculated based on a reference leak hole size factor and the regular leak value, the reference leak hole size factor determined by a test pressure, an external pressure and an ambient temperature during the object actual measurement step and a size of a reference leak hole of the leak device, and the object actual measurement leak value is converted into the regular-conditions-converted leak value based on the conversion factor.

Thereby, every time the test object is tested, the conversion factor reflecting the environmental conditions such as the temperature and the pressure at the time of the testing can be calculated and the object actual measurement leak value can be converted into the regular-conditions-converted leak value. Therefore, same results of the leak judgment can be surely obtained even if the conditions such as the temperature and the pressure vary as long as the sizes of the sealing defects are the same. Thereby, reliability of the leak judgment can be further enhanced.

Preferably, the reference leak hole size factor is calculated based on the device actual measurement leak value, a test pressure, an external pressure and an ambient temperature during the device actual measurement step.

Thereby, the reference leak hole size factor can be adequately determined even if the size (diameter, length or the like) of the reference leak hole is not sure or the diameter thereof is not constant. Furthermore, the adequacy of conversion can be enhanced.

Advantageous Effects of the Invention

According to the present invention, same results of the leak judgment can be obtained even if the conditions such as the temperature and the pressure vary as long as the sizes of the sealing defects are the same.

MODE FOR CARRYING OUT THE INVENTION

Embodiments of the present invention will be described hereinafter with reference to the drawings.

First Embodiment

Figure 1:
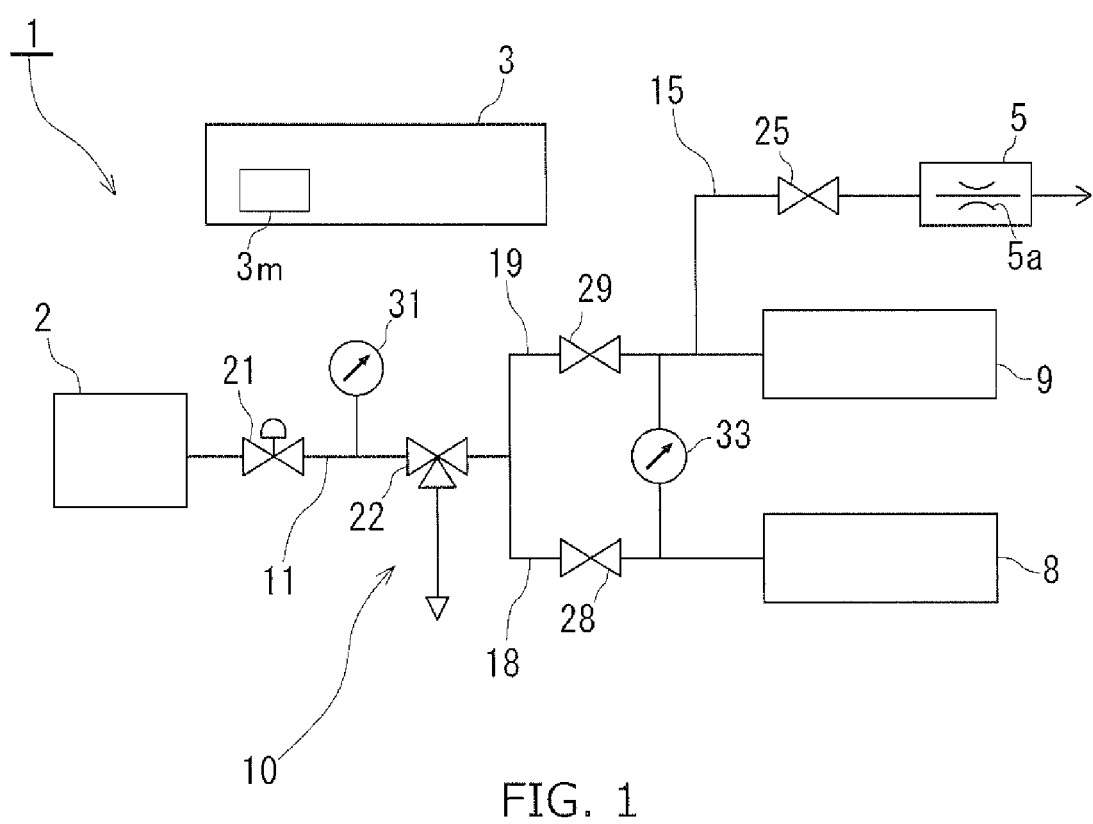
FIG. 1 is a circuit diagram of a leak testing apparatus according to a first embodiment of the present invention.

As shown in FIG. 1, a leak testing apparatus 1 includes a leak detection path 10, a processor 3 (controller) and a leak device 5. The leak detection path 10 includes a common path 11, a reference path 18 and a test path 19. The common path 11 extends from a pressure source 2. A pressure regulating valve 21, a pressure gauge 31 (test pressure measuring instrument) and a pressurizing/exhausting valve 22 that is a three-way valve are provided on the common path 11 arranged in this order from the pressure source 2 side.

The common path 11 branches into the reference path 18 and the test path 19. The reference path 18A is provided with a reference shutoff valve 28. A downstream end of the reference path 18 is connected to a reference container 8. The test path 19 is provided with a test shutoff valve 29. A downstream end of the test path 19 is connected to a test object 9. A differential pressure gauge 33 (leakage measuring instrument) is disposed between the reference path 18 and the test path 19 on a downstream side with respect to the shutoff valves 28, 29.

The valves 21 to 29 constitute valve arrangement.

A calibration path 15 extends from a point of the test path 19 on the downstream side (test object 9 side) with respect to the test shutoff valve 29. The calibration path 15 is provided with a calibration valve 25. The leak device 5 is disposed on a downstream end of the calibration path 15. The leak device 5 is connected to and disconnected from the leak detection path 10 by the opening and closing of the calibration valve 25. The leak device 5 is expected to behave in a similar manner to a "hole" (defect) of the test object, and is valued under designated temperature and pressure conditions (regular conditions). That is, the leak device 5 has a reference leak hole 5a and generates regular leak quantity $Q_{5S}$ (regular leak value) under regular temperature and pressure conditions. The regular temperature and pressure conditions and a value of the regular leak quantity $Q_{5S}$ are written on an outer surface or the like of the leak device 5.

The leak testing apparatus 1 is further provided with the processor 3.

The processor 3 includes a microcomputer and drive circuits for the valve arrangement 21 to 29 or the like. The processor 3 controls motions of the valve arrangement 21 to 29 or the like of the leak testing apparatus 1. The processor 3 further performs processing for a leak judgment. In addition to a sequence program of the leak testing, data required for the leak judgment including a threshold for judging leakage $Q_{9B}$ (Pa·m$^3$/s) of the test object 9, the regular leak quantity $Q_{5S}$ (Pa·m$^3$/s) of the leak device 5, a volume (m$^3$) of the test object 9 are stored in a memory 3m (storage device) of the microcomputer.

A method for leak testing using the leak testing apparatus 1 will be described hereinafter.

As a preparation, the regular leak quantity $Q_{5S}$ of the leak device 5 is stored in the processor 3. The threshold for judging leakage of the test object 9 is determined and stored in the processor 3.

Preferably, the leak device 5 whose regular leak quantity $Q_{5S}$ is close to the threshold for judging leakage of the test object 9 is selected. Preferably, the regular leak quantity $Q_{5S}$ is 0.8 to 1.2 times the threshold for judging leakage of the test object 9.

It is preferable that the regular conditions (regular temperature and regular pressure) on the leak device 5 are as close as possible to test conditions (temperature and pressure) at a site of leak testing of the test object 9.

Thereby, differences in variability characteristics between the leak device 5 and the test object 9 with respect to temperature and pressure can be minimized at least near the test conditions.

<Device Actual Measurement Step>

An acceptable test object 9 without leakage is connected to the test path 19 beforehand.

The common path 11, the reference path 18 and the test path 19 are made communicable with one another by the pressurizing/exhausting valve 22. The shutoff valves 28, 29 are opened. Thereby, pressure of air from the pressure source 2 is reduced to a test pressure by the pressure regulating valve 21. The test pressure is introduced to the reference container 8 through the reference path 18. At the same time, the test pressure is introduced to the acceptable test object 9 without leakage through the test path 19.

Next, the shutoff valves 28, 29 are closed. Thereby, a portion of the reference path 18 on the reference container 8 side with respect to the reference shutoff valve 28 and a portion of the test path 19 on the test object 9 side with respect to the test shutoff valve 29 become closed spaces independent from each other.

Next, the leak device 5 is connected to the leak detection path 10 by opening the calibration valve 25. Thereby, leakage is generated by the leak device 5 and a pressure difference is generated between the reference path 18 and the test path 19 on the downstream side with respect to the shutoff valves 28, 29. The pressure change $\Delta P_{5R}$ is detected by the differential pressure gauge 33. The actually measured data on the pressure change $\Delta P_{5R}$ are fed to the processor 3. The processor 3 calculates an actually measured leak quantity $Q_{5R}$ (device actual measurement leak value) from the leak device 5 by performing the following operation shown in Expression (2).

[Expression 2]

$$Q_{5R} = \frac{V \cdot \Delta P_{5R}}{\Delta t} \qquad (2)$$

where $\Delta t$ is a detection time (s) of an actually measured pressure change $\Delta P_{5R}$.

<Calculation of Conversion Factor>

The processor 3 further calculates a conversion factor k by Expression (3) shown below and stores the conversion factor k in the memory 3m.

[Expression 3]

$$k = \frac{Q_{5S}}{Q_{5R}} = \frac{Q_{5S}}{\Delta P_{5R}} \frac{\Delta t}{V} \qquad (3)$$

It is preferable that the actually measured leak quantity $Q_{5R}$ (or the actually measured pressure change $\Delta P_{5R}$) of the leak device is a value from which variations due to a temperature change by the introduction of the test pressure or by an expansion or the like of the test object 9 are cancelled out. To cancel out the variations, known methods such as a mastering method (refer to Japanese Patent Application Publication No. H9-33381), a fitting method (refer to Japanese Patent Application Publication No. 2004-061201) and a linear fitting method (refer to Japanese Patent Application Publication No. 2012-255687) may be adopted.

<Object Actual Measurement Step>

After this, a leak testing is conducted on an actual test object 9.

Specifically, the actual test object 9 is connected to the test path 19.

The common path 11, the reference path 18 and the test path 19 are made communicable with one another by the pressurizing/exhausting valve 22. The shutoff valves 28, 29 are opened. Thereby, pressure of air from the pressure source 2 is reduced to a test pressure by the pressure regulating valve 21. The test pressure is introduced to the reference container 8 through the reference path 18. At the same time, the test pressure is introduced to the test object 9 through the test path 19.

Next, the shutoff valves 28, 29 are closed. Thereby, the portion of the reference path 18 on the reference container 8 side with respect to the reference shutoff valve 28 and the portion of the test path 19 on the test object 9 side with respect to the test shutoff valve 29 become closed spaces independent from each other.

Next, a time variation $\Delta P_{9R}$ (actually measured pressure change) of a pressure difference between the reference path 18 and the test path 19, and furthermore a pressure difference between the reference container 8 and the test object 9 are detected by the differential pressure gauge 33. The actually measured pressure change $\Delta P_{9R}$ is fed to the processor 3. The processor 3 calculates a regular-conditions-converted leak value $Q_{9S}$ by performing the following operation shown in Expression (4) (converting step). Similar to the above, it is preferable that the regular-conditions-converted leak value $Q_{9S}$ (or the actually measured pressure change $\Delta P_{9R}$) is a value from which variations due to a temperature change by the introduction of the test pressure or by an expansion or the like of the test object 9 are cancelled out.

[Expression 4]

$$Q_{9S} = k \frac{V \cdot \Delta P_{9R}}{\Delta t} \qquad (4)$$

That is, based on the actually measured leak quantity of the leak device $Q_{5R}$ (=$Q_{5S}$/k), an actually measured leak quantity of the test object $Q_{9R}$ corresponding to the actually measured pressure change of the test object $\Delta P_{9R}$ is converted into a value under the regular conditions. The regular-conditions-converted leak value $Q_{9S}$ is a hole-size-corresponding value corresponding to a size of a virtual defect hole (virtual sealing fault) of the test object 9, and is constant even if environmental conditions such as temperature and pressure change as long as sizes of the sealing fault are the same.

<Judging Leakage>

Nest, the leak judgment is made based on the regular-conditions-converted leak value $Q_{9S}$ (hole-size-corresponding value).

Specifically, if regular-conditions-converted leak value $Q_{9S}$ does not exceed a threshold value $Q_{9B}$, the test object 9 is judged to be acceptable (no leakage). If the regular-conditions-converted leak value $Q_{9S}$ exceeds the threshold value $Q_{9B}$, the test object 9 is judged to be not-acceptable (with leakage).

Thereby, the same results of the leak judgment can be obtained even if the conditions such as temperature and pressure change as long as the sizes of the sealing fault are the same.

After the completion of the measurement, the test pressures in the test path 19 and the reference path 18, and furthermore the test pressures in the reference container 8 and the test object 9 are released by opening the shutoff valves 28, 29 and bringing the pressurizing/exhausting valve 22 to a position open to the atmosphere.

After that, the leak testing is sequentially performed on a plurality of test objects 9 in the similar manner.

The processor 3 monitors transition (change over time) of the actually measured leak quantity $Q_{9R}$ by accumulating the actually measured leak quantity $Q_{9R}$ of the test objects 9 judged to be acceptable in the memory 3m one by one.

Then, when the actually measured leak quantity $Q_{9R}$ of a posterior test object 9 judged to be acceptable is increased or decreased by more than a predetermined percentage (3 percent to 10 percent, for example) with respect to the actually measured leak quantity $Q_{9R}$ of a prior test object 9 judged to be acceptable, the device actual measurement step is performed anew. Thereby, when an extent of variation from the actually measured leak quantity of the leak device $Q_{5R}$ obtained last time due to gradual variation of the temperature or the pressure is great, the actually measured leak quantity of the leak device $Q_{5R}$, and furthermore the conversion factor k, can be updated to a value corresponding to the temperature and pressure after the variation. The regular-conditions-converted leak value $Q_{9S}$ is calculated using the updated actually measured leak quantity of the leak device $Q_{5R}$ or the updated conversion factor k and the leak judgment is made thereafter. As a result, accuracy of the leak judgment can be secured. Moreover, unless the temperature or the pressure varies rapidly and greatly, it is not required to measure the actually measured leak quantity of the leak device $Q_{5R}$ frequently for updating, thereby troubles can be avoided.

Furthermore, according to the first embodiment, it is not required to provide a temperature sensor, a pressure sensor or means for monitoring measured values from these sensors, thereby increase in product cost can be prevented.

Other embodiments of the present invention will be described hereinafter. Same reference numerals are used in the drawings to designate parts that correspond to those in the foregoing embodiments and description thereof will be omitted.

Second Embodiment

Figure 2:
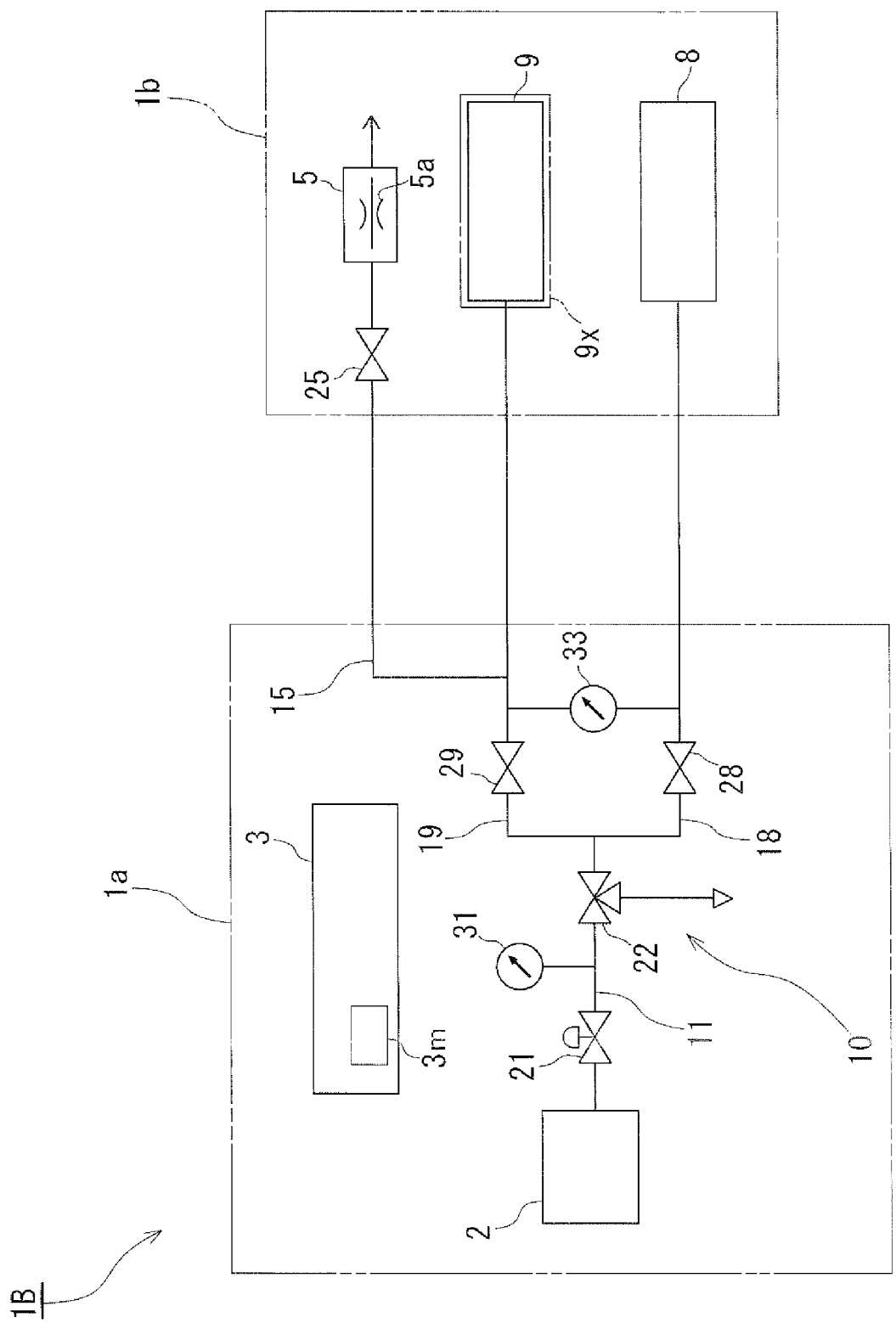
FIG. 2 is a circuit diagram of a leak testing apparatus according to a second embodiment of the present invention.

As shown in FIG. 2, a leak testing apparatus 1B according to a second embodiment includes an apparatus housing 1a and a test section 1b.

A pressure source 2, a processor 3, a portion of a leak detection path 10 and pneumatic elements 21, 22, 28, 29, 31, 33 disposed in the portion are housed in the apparatus housing 1a, the portion being from a point at which the leak detection path 10 is connected to the pressor source 2 to a differential pressure gauge 33. Although not shown in the drawings, the apparatus housing 1a further houses a monitor, an input device such as a touch panel and manual operation devices for valve arrangement 21 to 29 or the like.

A reference container 8, a test object placement portion 9x, a leak device 5 and a calibration valve 25 are disposed in the test section 1b. A test object 9 is placed on the test object placement portion 9x. A reference path 18 extends from the apparatus housing 1a and is introduced into the test section 1b. A distal end portion of the reference path 18 is connected to the reference container 8. A test path 19 extends from the apparatus housing 1a and is introduced into the test section 1b. A distal end portion (test object connecting portion) of the test path 19 is connected to the test object 9. A calibration path 15 extends from the apparatus housing 1a and is introduced into the test section 1b. A leak device connecting portion at a distal end of the calibration path 15 is connected to the leak device 5. The calibration valve 25 is disposed on a portion of the calibration path 15 in the test section 1b. The calibration valve 25 is remotely controlled by the processor 3 in the apparatus housing 1a.

The test object placement portion 9x and the leak device 5 are disposed in the test section 1b adjacent to each other. That is, the leak device 5 is placed adjacent to the test object 9.

Thereby, the leak device 5 can be placed under generally the same temperature and pressure conditions as the test object 9 and subjected to as same variations as possible as the test object 9. Furthermore, accuracy in leak judgment based on an actually measured leak quantity $Q_{5R}$ of the leak device 5 can be secured.

The reference container 8 of the leak testing apparatus 1B may be placed inside the apparatus housing 1a.

Third Embodiment

Figure 3:
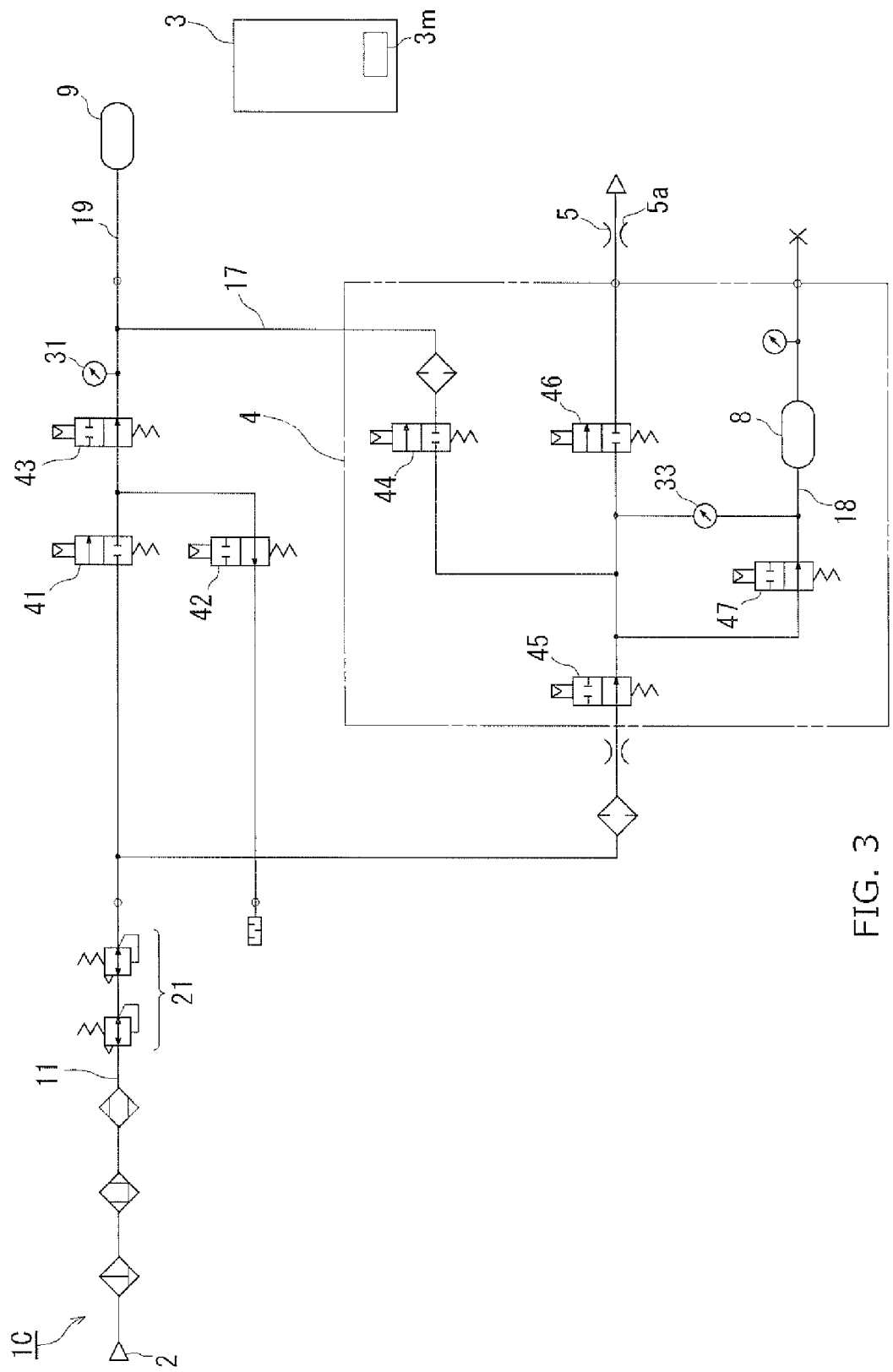
FIG. 3 is a circuit diagram of a leak testing apparatus according to a third embodiment of the present invention.
Figure 4:
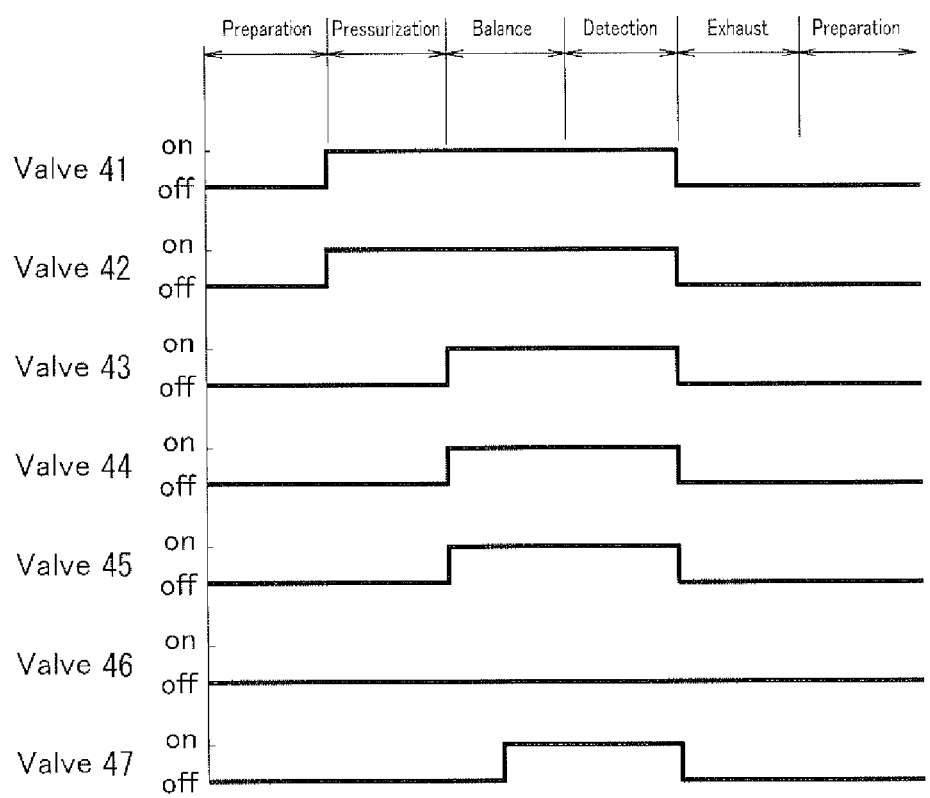
FIG. 4 is a time chart of a behavior of the leak testing apparatus according to the third embodiment.

FIG. 3 shows a leak testing apparatus 1C according to a third embodiment of the present invention. The leak testing apparatus 1C is provided with electromagnetic on-off valves 41 to 47 as a valve arrangement. FIG. 4 is a flow chart of on-off operations of the on-off valves 41 to 47.

A test pressure is introduced to a test object 9 by opening the valve 44 and closing the valve 42 in a pressurizing step. On the other hand, the test pressure is constantly introduced to a reference container 8 via the valves 45, 47.

The reference container 8 and the test object 9 are made communicable with each other via a communication path 17 by closing the valve 43, opening the valve 44 and closing the valve 45 in an equilibrium step.

Subsequently, the reference container 8 and the test object 9 are shut off by closing the valve 47.

Then, differential pressure is detected (measurement of actually measured leak quantity $Q_{9R}$) by a differential pressure gauge 33.

After the completion of the detection step, the valve 41 is closed, the valves 42, 43 are opened, the valve 44 is closed and the valves 45, 47 are opened. Thereby, the test object 9 is opened to the atmosphere. On the other hand, the reference container 8 is not opened to the atmosphere and maintained at the test pressure.

Thereby, effects of adiabatic compression of the reference container 8 can be eliminated. The calibration valve 46 is constantly closed.

An air path including the valves 44 to 47, the differential pressure gauge 33 and the reference container 8 or the like is incorporated in a measurement block 4 made of metal indicated by dashed-two dotted line in FIG. 3.

Fourth Embodiment

Figure 5:
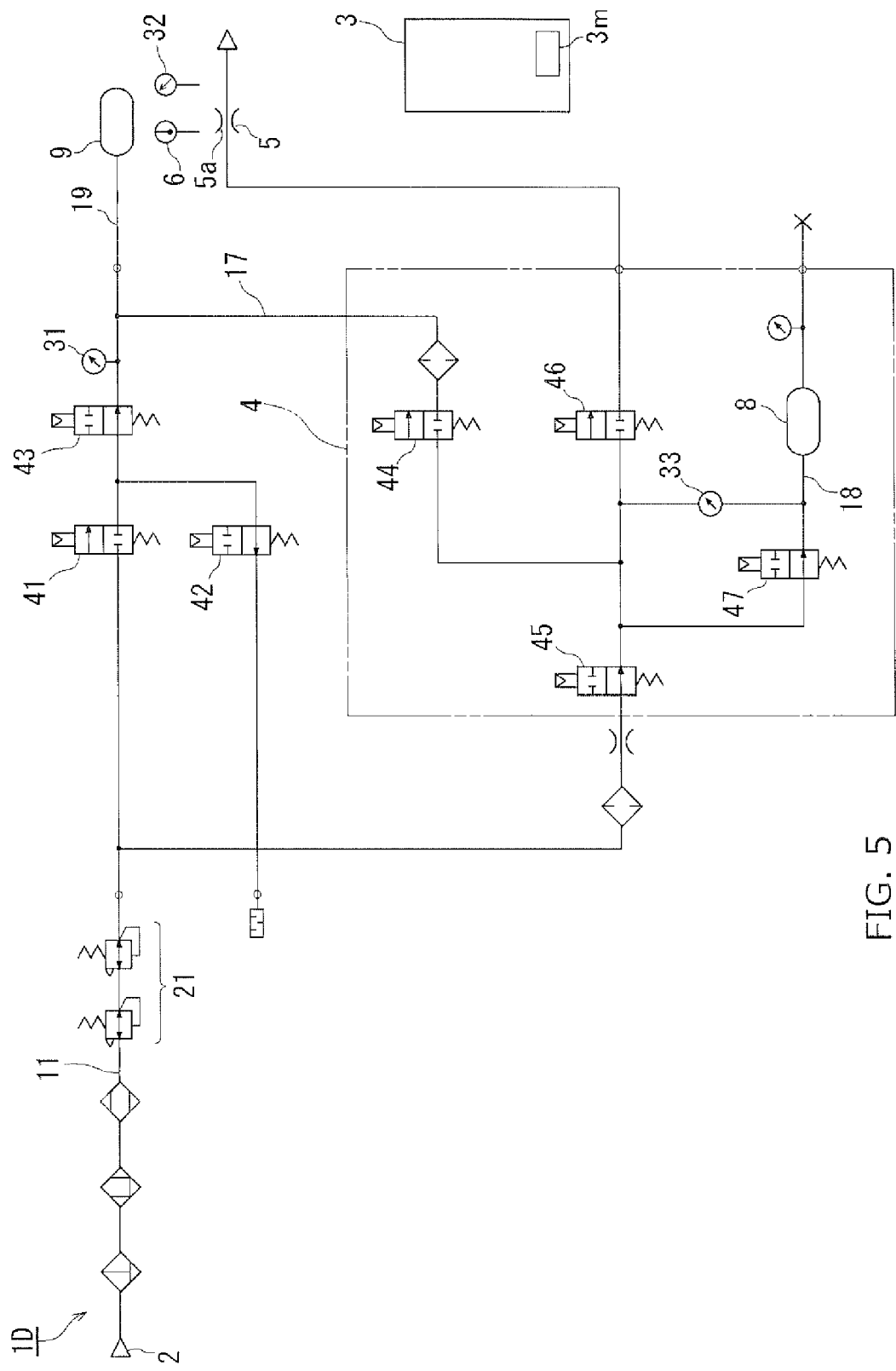
FIG. 5 is a circuit diagram of a leak testing apparatus according to a fourth embodiment of the present invention.

FIG. 5 shows a leak testing apparatus 1D according to a fourth embodiment of the present invention. In addition to the features of the leak testing apparatus 1C according to the third embodiment (FIG. 4), the leak testing apparatus 1D further includes a temperature measuring instrument 6 and an atmospheric pressure measuring instrument 32 (external pressure measuring instrument). A test object 9 and a leak device 5 are placed adjacent to each other. The temperature measuring instrument 6 and the atmospheric pressure measuring instrument 32 are placed adjacent to the test object 9 and the leak device 5.

The temperature measuring instrument 6 measures a temperature $T_6$ (degrees C. or K) of the leak testing apparatus 1D particularly in a portion thereof around the test object 9 and the leak device 5.

The atmospheric pressure measuring instrument 32 measures an external pressure of the test object 9 and the leak device 5, specifically, an absolute pressure $P_{32}$ (Pa-abs.) of an atmospheric pressure around the test object 9 and the leak device 5. The absolute pressure $P_{32}$ of the atmospheric pressure correspond to the external pressure of the test object 9 (outlet pressure of a sealing defect) or the external pressure of the leak device 5 (outlet pressure of a leak hole 5a).

Alternatively, two atmospheric pressure measuring instruments 32 may be disposed, one near the test object 9 and the other near the leak device 5. Two temperature measuring instruments 6 may be disposed, one near the test object 9 and the other near the leak device 5.

In the leak testing apparatus 1D, a leak testing is performed in the following manner:

<Device Actual Measurement Step>

In a device actual measurement step, a change in actually measured pressure of the leak device $\Delta P_{5R}$ is measured by a differential pressure gauge 33 (leakage measuring instrument) and a device actual measurement leak value $Q_{5R}$ is calculated by Expression 2.

Furthermore, a test pressure $P_{31}$ (Pa) is measured by a test pressure measuring instrument 31, the absolute pressure $P_{32}$ (Pa-abs.) of the atmospheric pressure is measured by the atmospheric pressure measuring instrument 32 and the ambient temperature $T_6$ (K) is measured by the temperature measuring instrument 6. Measured values obtained in the device actual measurement step are indicated as $P_{31A}$, $P_{32A}$ and $T_{6A}$ by adding A to the respective ends of subscripts of the measured values $P_{31}$, $P_{32}$ and $T_6$.

From the Hagen-Poiseuille equation (Expression 1), the following relationship is satisfied by the values $Q_{5R}$, $P_{31A}$, $P_{32A}$ and $T_{6A}$:

[Expression 5]

$$Q_{5R} = A \cdot \frac{1}{\eta_{6A}} \cdot \frac{P_{31A} + P_{32A}}{2} (P_{31A} + P_{32A}) \cdot \frac{T_s}{T_{6A}} \quad (5)$$

where the test pressure $P_{31A}$ in the Expression 5 is an absolute pressure (Pa-abs.). When the test pressure measuring instrument 31 is a gauge pressure sensor, a measured value measured by the test pressure measuring instrument 31 is converted into an absolute pressure $P_{31A}$ by adding an actually measured value of the atmospheric pressure $P_{32A}$.

$T_S$ is a temperature under regular conditions (K). For example, $T_S$=296.15 K (=23 degrees C.).

$\eta_{6A}$ is a viscosity coefficient (Pa·s) of gas (air) at an actually measured temperature $T_{6A}$(K). For example, since the viscosity coefficient of air at 20 degrees C. (=293.15K) is 18.2×10$^{-5}$ (Pa·S), the following relationship is satisfied from the Sutherland's formula:

[Expression 6]

$$\eta_{6A} = 18.2 \times 10^{-5} \cdot \left(\frac{293.15 + C}{T_{6A} + C}\right) \cdot \left(\frac{T_{6A}}{293.15}\right)^{\frac{3}{2}} \quad (6)$$

where C is a Sutherland's constant, which is C=117 for air.

"A" in the first term in the right-hand side of Expression 5 is a reference leak hole size factor determined by a size ($D_4$, $L_5$) of the reference leak hole 5a of the leak device 5. The reference leak hole size factor can be defined as follows from the Hagen-Poiseuille equation (Expression 1), for example:

[Expression 7]

$$A = \frac{\pi D_5^4}{128 L_5} \quad (7)$$

where $D_5$ is a diameter of the reference leak hole 5a of the leak device 5. $L_5$ is a length of the reference leak hole 5a of the leak device 5. That is, the reference leak hole size factor A is a factor that shows the size of the reference leak hole 5a. Specifically, the reference leak hole size factor A is proportional to biquadratic number of the diameter $D_5$ of the reference leak hole 5a and is inversely proportional to the length $L_5$ of the reference leak hole 5a.

The reference leak hole size factor A can be further expressed as follows form Expression 5 and Expression 6:

[Expression 8]

$$A = Q_{5R} \cdot 18.2 \times 10^{-5} \cdot \left(\frac{293.15 + C}{T_{6A} + C}\right) \cdot$$

$$\left(\frac{T_{6A}}{293.15}\right)^{\frac{3}{2}} \cdot \frac{2}{(P_{31A} + P_{31B}) \cdot (P_{31A} - P_{31B})} \cdot \frac{T_{6A}}{T_S} \quad (8)$$

The diameter $D_4$ and the length L4 of the reference leak hole 5a may be inaccurate because it is unknown or due to manufacturing errors. The diameter $D_4$ may vary depending on a position of the reference leak hole 5a in a longitudinal direction. A cross-section of the reference leak hole 5a may not be an exact circle. To cope with such situations, the reference leak hole size factor A is calculated by plugging in measured values for $Q_{5R}$, $P_{31A}$, $P_{32A}$ and $T_{6A}$ of Expression 8 in the device actual measurement step of the fourth embodiment. Thereby, even if the diameter $D_4$ and the length L4 of the reference leak hole 5a are inaccurate or the diameter $D_4$ is not constant, the reference leak hole size factor A can be set appropriately. The reference leak hole size factor A is stored in a memory 3m.

The device actual measurement step, and therefore the step of calculating the reference leak hole size factor A may be performed regularly at a fixed time such as at the beginning of work in the morning or in the afternoon or performed irregularly such as when environmental conditions such as temperature and pressure changes greatly.

When the diameter $D_4$ and the length $L_5$ of the reference leak hole 5a are accurately known, the reference leak hole size factor A may be calculated from Expression 7.

<Object Actual Measurement Step>

When the test object 9 is actually tested, a change in differential pressure $\Delta P_{9R}$ is measured by the differential pressure gauge 33 and an object actual measurement leak value $Q_{9R}$ is calculated by Expression 9.

[Expression 9]

$$Q_{9R} = \frac{V \cdot \Delta P_{9R}}{\Delta t} \quad (9)$$

The test pressure $P_{31}$ (Pa) is measured by the test pressure measuring instrument 31, the absolute pressure $P_{32}$ (Pa-abs.) of the atmospheric pressure is measured by the atmospheric pressure measuring instrument 32 and the ambient temperature $T_6$ (K) is measured by the temperature measuring instrument 6. Measured values obtained in the object actual measurement step are indicated as $P_{31B}$, $P_{32B}$ and $T_{6B}$ by adding B to the respective ends of subscripts of the measured values $P_{31}$, $P_{32}$ and $T_6$.

From the Hagen-Poiseuille equation (Expression 1), the following relationship is satisfied as with Expression 5:

[Expression 10]

$$Q_{5R} = A \cdot \frac{1}{\eta_{6B}} \cdot \frac{P_{31B} + P_{32B}}{2} (P_{31B} - P_{32B}) \cdot \frac{T_s}{T_{6B}} \quad (10)$$

where the test pressure $P_{31B}$ in the Expression 10 is an absolute pressure (Pa-abs.). When the test pressure measuring instrument 31 is a gauge pressure sensor, a measured value measured by the test pressure measuring instrument 31 is converted into an absolute pressure $P_{31B}$ by adding an actually measured value of the atmospheric pressure $P_{32B}$.

$\eta_{6B}$ is a viscosity coefficient (Pa·s) of gas (air) at an actually measured temperature $T_{6B}$(K). For example, since the viscosity coefficient of air at 20 degrees C. (=293.15K) is $18.2\times10^{-5}$ (Pa·S), the following relationship is obtained from the Sutherland's formula:

[Expression 11]

$$\eta_{6B} = 18.2\times 10^{-5} \cdot \left(\frac{293.15+C}{T_{6B}+C}\right) \cdot \left(\frac{T_{6B}}{293.15}\right)^{\frac{3}{2}} \quad (11)$$

By plugging in Expressions 10 and 11 to the left-hand side and the middle side of Expression 3, the following expression is obtained:

[Expression 12]

$$k = \frac{Q_{5s} \cdot 2}{A \cdot (P_{31B}+P_{32B}) \cdot (P_{31B}-P_{32B})} \cdot \frac{T_{6B}}{T_S} \cdot 18.2\times \\ 10^{-5} \cdot \left(\frac{293.15+C}{T_{6B}+C}\right) \cdot \left(\frac{T_{6B}}{293.15}\right)^{\frac{3}{2}} \quad (12)$$

Accordingly, the conversion factor k can be accurately obtained from the measured values $P_{31B}$, $P_{32B}$ and $T_6$ obtained by the actual measurement of the test object 9 and the reference leak hole size factor A regarding the leak device 5 and a regular leak value $Q_{5S}$. Using the conversion factor k, the object actual measurement leak value $Q_{9R}$ is converted into a regular-conditions-converted leak value $Q_{9S}$ by performing the following operation (conversion step):

[Expression 13]

$$Q_{9S} = k \cdot Q_{9R} \quad (13)$$

Then, hermeticity of the test object 9 is judged based on the regular-conditions-converted leak value $Q_{9S}$. Specifically, if the $Q_{9S}$ does not exceed a threshold value, the test object 9 is judged to be acceptable (no leakage). If the $Q_{9S}$ exceeds the threshold value, the test object 9 is judged to be not-acceptable (with leakage).

In the leak testing apparatus 1D, the conversion factor k reflecting the environmental conditions at the time of the testing can be calculated every time the test object 9 is tested, and the object actual measurement leak value $Q_{9R}$ can be converted into the regular-conditions-converted leak value $Q_{9S}$. Therefore, same results of judgment on leakage can be surely obtained even if conditions such as temperature and pressure vary as long as sizes of sealing defects are same. Thus, reliability of judgment on leakage can be further enhanced.

Moreover, by updating the reference leak hole size factor A used for the calculation of the conversion factor k regularly or irregularly, adequacy of conversion into the regular-conditions-converted leak value $Q_{9S}$ can be enhanced.

The present invention is not limited to the embodiments described above. Various modifications can be made without departing from the scope and spirit of the invention.

For example, the leakage is not necessarily judged based on the flow rate. The leakage may be judged based on differential pressure or direct pressure.

The pressure source 2 is not limited to a positive pressure source such as an air compressor. The pressure source 2 may be a negative pressure source such as a vacuum pump.

The application of the present invention is not limited to the air leak testing. The present invention may be applied to helium leak testing, hydrogen leak testing and other kinds of leak testing.

INDUSTRIAL APPLICABILITY

The present invention may be applied to judgment on acceptance or rejection of a sealed item

EXPLANATION OF REFERENCE NUMERALS

1, 1B, 1C, 1D leak testing apparatus
1a apparatus housing
1b test section
2 pressure source
3 processor (controller)
3m memory (storage device)
4 measurement block
5 leak device
5a reference leak hole
6 temperature measuring instrument
8 reference container
9 test object
10 leak detection path
11 common path
15 calibration path
18 reference path
19 test path
21 pressure regulating valve
22 three-way valve
25 calibration valve
28 reference shutoff valve
29 test shutoff valve
31 pressure gauge (test pressure measuring instrument)
32 atmospheric pressure measuring instrument (external pressure measuring instrument)
33 differential pressure gauge (leakage measuring instrument)
A reference leak hole size factor
k conversion factor
$P_{31A}$ actually measured value of test pressure at the device actual measurement step
$P_{31B}$ actually measured value of test pressure at the object actual measurement step
$P_{32A}$ actually measured value of the atmospheric pressure at the device actual measurement step (actually measured value of external pressure)
$P_{32B}$ actually measured value of the atmospheric pressure at the object actual measurement step (actually measured value of external pressure)
$\Delta P_{5R}$ change in actually measured pressure of the leak device (device actual measurement leak value)
$\Delta P_{9R}$ change in actually measured pressure of the test object $Q_{5S}$ regular leak quantity (regular leak value)
$Q_{5R}$ actually measured leak quantity of the leak device (device actual measurement leak value)
$Q_{9R}$ actually measured leak quantity of the test object (object actual measurement leak value)
$Q_{9S}$ regular-conditions-converted leak value
$Q_{9B}$ threshold for judging leakage of the test object
$T_{6A}$ actually measured value of ambient temperature at the device actual measurement step
$T_{6B}$ actually measured value of ambient temperature at the object actual measurement step
$T_S$ regular condition temperature

The invention claimed is:

1. A leak testing apparatus for detecting leakage of a test object, comprising:
   a leak detection path including a test path to be connected to the test object, wherein a test pressure is to be provided to the test object through the test path;
   a leak device disposed on the leak detection path, the leak device generating a regular leakage (referred to as a "regular leak value" hereinafter) under predetermined temperature and pressure (referred to as "regular conditions" hereinafter);
   a leak measuring instrument disposed on the leak detection path; and
   a processor,
   wherein the processor performs:
   a device actual measurement operation, wherein the leakage measuring instrument measures leakage of the leak device (referred to as "device actual measurement leak value" hereinafter);
   an object actual measurement operation, wherein the leakage measuring instrument measures leakage of the test object (referred to as "object actual measurement leak value" hereinafter); and
   a judgment operation, the processor converting the object actual measurement leak value into a regular-conditions-converted leak value under the regular conditions based on the device actual measurement leak value and making a leak judgment based on the regular-conditions-converted leak value;
   wherein the leak testing apparatus further comprising:
   a test pressure measuring instrument for measuring the test pressure;
   an external pressure measuring instrument for measuring an external pressure of the leak device or the test object; and
   a temperature measuring instrument for measuring ambient temperature of the leak device or the test object, wherein the processor calculates a conversion factor for converting the object actual measurement leak value into the regular-conditions-converted leak value based on values measured by the test pressure measuring instrument, the external pressure measuring instrument and the temperature measuring instrument during the object actual measurement operation, a reference leak hole size factor and the regular leak value, the reference leak hole size factor determined by a size of a reference leak hole of the leak device.

2. A method for leak testing for testing leakage of a test object, comprising steps of:
   actually measuring a leak value of a leak device (device actual measurement leak value) with the leak device made communicable with a leak detection path through which a test pressure is supplied, the leak device generating a regular leakage (referred to as a "regular leak value" hereinafter) under predetermined temperature and pressure (referred to as "regular conditions" hereinafter) (device actual measurement step);
   actually measuring a leak value of the test object (object actual measurement leak value) with the test object connected to the leak detection path (object actual measurement step); and
   judging a leak based on a regular-conditions-converted leak value under the regular conditions, wherein the object actual measurement leak value is converted into the regular-conditions-converted leak value based on the device actual measurement leak value wherein:
   a plurality of test objects is sequentially subjected to the leak judgment, and
   the device actual measurement leak value is updated by performing the device actual measurement step anew when an actual measurement leak value of a posterior test object judged to be acceptable is increased or decreased by more than a predetermined percentage with respect to an actual measurement leak value of a prior test object judged to be acceptable.

3. The method for leak testing according to claim 2, wherein:
   a conversion factor is calculated based on the regular leak value and the device actual measurement leak value, and
   the object actual measurement leak value is converted into the regular-conditions-converted leak value based on the conversion factor.

* * * * *